Feb. 25, 1969  H. DE FRANCE ET AL  3,429,731
MAKING OF MULTI-COLOR LUMINESCENT SCREENS
Filed June 2, 1965
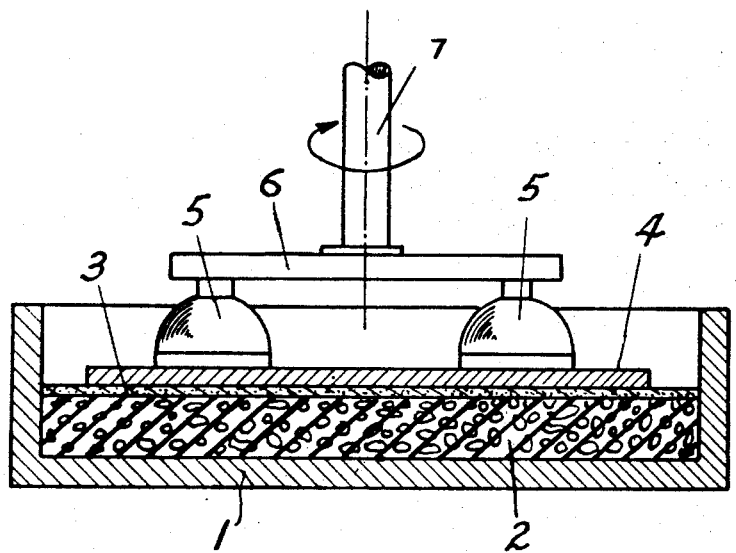
INVENTORS.
HENRI de FRANCE
ROGER RAYMOND CAHEN
BY Kurt Kelman
Agent United States Patent Office 3,429,731
Patented Feb. 25, 1969

3,429,731
MAKING OF MULTI-COLOR LUMINESCENT SCREENS
Henri de France and Roger R. Cahen, Levallois, France, assignors to CFT—Compagnie Francaise de Television, a corporation of France
Filed June 2, 1965, Ser. No. 460,756
Claims priority, application France, June 8, 1964, 977,420; May 19, 1965, 17,610
U.S. Cl. 117—19    4 Claims
Int. Cl. B44c 1/00; B44d 1/44

ABSTRACT OF THE DISCLOSURE

A method of making multi-color luminescent screens, wherein the screen is provided with a pattern of varnish and phosphor particles are deposited on the screen by applying the screen under pressure to a layer of the particles spread upon a sponge rubber support.

---

This invention is directed to a new and improved process in the manufacture of plane luminescent screens, such as used in colour television receiving tubes.

The luminescent side of a screen of the aforesaid type is covered by several phosphors, generally blue, red and green in the usual case of a tricolour screen, which will henceforth be considered by way of a non limitative example. Each phosphor must cover well defined discrete areas of the screen. Usually the phosphors are arranged in strips or in dots of different colours.

The invention has more particularly for its object the provision of an improvement in the manufacture of multicoulour screens by the printing methods. In such methods, each phosphor is successively deposited and fixed on those areas of the screen which it has to cover.

There are however two different ways of applying the printing method, according to the substance which is used for the impression.

In the first one, a "luminescent ink" is used, which is a printing varnish containing in suspension particles of the phosphor to be deposited.

In the other method, only the varnish, essentially consisting of linseed oil, polyvinyl alcohol, glycol, for example, is deposited by printing; thereafter the screen is manually powdered with particles of phosphor by means of a pad. The particles of phosphor adhere much more to the viscous areas formed by the varnish than to other areas of the screen. Those particles which are deposited outside of the desired areas are then eliminated by known methods.

In either case the process, for a given phosphor, ends with a dessication through heating the screen in a drying room.

When those various steps have been performed for each phosphor, the printing varnish is burnt away through heating the screen, in a furnace, to about 400° C., i.e. to a temperature which is sufficiently high for causing the varnish to burn away but lower than that which would impair the properties of the phosphors. The phosphors are finally fixed more firmly to the screen plate, for example through vaporization of an aereosol of sodium silicate and barium nitrate, and subsequent drying in a drying room.

The luminescent side of the screen is then aluminized.

The use of a "luminescent ink" presents two serious drawbacks, if the impression is made by the convenient offset method, in other words by means of a rubber block carrying in relief the pattern according to which the ink must be deposited: the use of the ink causes an abrasion of the rubber of the printing machine, and the rubber causes a fragmentation of the particles of phosphor, which lose their sensitivity owing to fracture of their crystallization axes.

Printing by means of the varnish alone has other drawbacks: manual powdering with a pad does not allow the impregnation of the varnish with a layer of particles sufficiently thick to result in very bright screens. The deposit is always irregular, whatever the skill of the workman. The pad becomes impregnated with varnish, and therefore adhesive, and when a second or a third phosphor is deposited, it takes away particles of the first or the second one, thus causing pollution between the various patterns. The powdering operation always brings about a waste of phosphor and, moreover, the dispersion of phosphor particles in the atmosphere makes it necessary to take safety measures, as the phosphors are generally toxic.

After the powdering has been performed, the elimination of the phosphor particles which have been deposited outside of the varnished areas has to be effected by comparatively unsatisfactory procedures, such as mechanical jolts, or blowing of compressed air, because more drastic methods would result in the elimination of particles from the varnish pattern to which the particles adhere, but are not yet firmly fixed. Brushing has also been proposed to that end, but this may deform the varnish patterns, and also contribute to the adhesion of phosphor particles to undesired areas on account of the static electric charges which are developed.

Summing up, the elimination of the particles deposited on undesired areas is never perfect.

The invention allows printing by means of the varnish alone without incurring the above mentioned drawbacks.

According to the invention, there is provided a method for making multi-colour luminescent screens, comprising, for each phosphor to be deposited, the steps of printing the corresponding pattern with a varnish, depositing phosphor particles on the screen, eliminating the phosphor particles from the unvarnished areas, and, when those steps have been completed for each phosphor, the steps of causing the varnish to burn away and fixing more strongly the non eliminated particles to the screen, wherein the step of depositing the particles of each phosphor on the screen is effected through applying the screen as a whole, under pressure, on the surface of a layer of phosphor particles, spread on a highly elastic or spongy support.

If desired, this application of the screen onto the layer of phosphor particles may be associated with a slight motion imparted to the screen in its plane.

The invention together with further objects and advantages thereof, may be best understood by reference to the following description, taken in conjunction with the accompanying drawing, which is a schematic illustration of an embodiment of an apparatus for carrying out the method according to the invention.

On this figure, screen 4, on one side of which the varnish has been deposited according to a desired pattern, preferably by the offset process, is held by suckers 5 fixed to two points of the lower side of a plate 6. On the upper side of this plate, a shaft 7 is fixed thereto. If desired, the shaft can be rotated, either manually or by any suitable means, a few degrees about its axis.

The screen is applied under pressure onto the layer of phosphor particles 3, laid on a spongy support, for example a plate of sponge rubber 2, resting on the bottom of a tank 1.

Under the effect of the pressure exerted on the screen, the particles penetrate inside the varnish film within a few seconds.

If desired, a rotation of a few degrees may be imparted to shaft 7, the optimal number of degrees depending upon the pressure exerted, the dimensions of the phosphor particles, and the viscosity of the film.

Of course, this simple rotary motion is not the only possible one. For instance, it could be substituted by an alternating motion of the screen along two opposite directions of its plane, this having, relatively to the rotary motion, the advantage that the same displacement is imparted to all points of the screen.

The motion of the screen may also be substituted by a motion of the support.

The screen is thereafter raised by means of the suckers, and laid on a stack coming into contact with the screen only along the peripheral part thereof. Then the phosphors are fixed more firmly to the screen in any known manner, such as through vaporization of an aereosol of sodium silicate and barium nitrate, and subsequent drying in a drying room.

The screens made in this way are particularly luminous, have a very uniform brightness, and show only negligible pollution between the several phosphors.

Moreover, as the phosphor particles are deeply incorporated into the varnish film and thus adhere more strongly, the elimination of the particles deposited or unvarnished areas can be performed very effectively through washing the screen with a liquid.

The washing liquid is a solution in water of a wetting agent, such as sodium oleate. The washing can be performed in three different ways, taken individually or jointly: the screen may be washed through immersion in a bath; the solution may be caused to flow over the surface of the screen; or the solution may be projected onto the screen.

However the deep penetration of the phosphor particles into the varnish film, which allows a washing of the screen, can, on the other hand, make more difficult the subsequent elimination of the varnish. The varnish is combustible and can be burnt away only in the presence of a combustible, which usually, is the oxygen of the atmosphere of the furnace, and it happens that the burning of the varnish is incomplete, even if the circulation of air is accelerated. The deep penetration of the phosphor particles into the varnish film may make the complete burning away of the varnish more critical in the sole presence of the oxygen of the atmosphere. If necessary, this drawback is eliminated by adding a combustive to the varnish used for the printing.

This combustive in turn should not give rise to residues, but supply locally the oxygen required for a complete combustion of the varnish. It may be added, for example, under the form of a solution of nitrocellulose in isoamyl acetate or any other organic substance compatible with the varnish.

Although the invention is of particular interest in the case of offset printing, it can of course also be advantageously applied when the printing is made by other means, for example with a stencil plate,

What is claimed is:
1. A method for making multi-colour luminescent screens, said method comprising, for each phosphor to be deposited, the steps of printing the corresponding pattern with a varnish, depositing phosphor particles onto the screen, eliminating the phosphor particles from the unvarnished areas, and when those steps have been completed for each phosphor, the steps of causing the varnish to burn away, and fixing more firmly the non eliminated particles to the screen, wherein the step of depositing the particles of each phosphor on the screen is effected through applying the screen, as a whole, under pressure, onto the surface of a layer of particles, spread on a support of sponge rubber.

2. A method for making multi-colour luminescent screens, said method comprising, for each phosphor to be deposited, the steps of printing the corresponding pattern with a varnish, depositing phosphor particles onto the screen, eliminating the phosphor particles from the unvarnished areas by washing said screen with a liquid, and when those steps have been completed fo reach phosphor, the steps of causing the varnish to burn away, and fixing more firmly the non eliminated particles to the screen, wherein the step of depositing the particles of each phosphor on the screen is effected through applying the screen, as a whole, under pressure, onto the surface of a layer of particles, spread on a support of sponge rubber.

3. In a method of making multi-colour luminescent screens wherein the screen carries a pattern of a tacky substance, the steps of depositing phosphor particles onto the screen, said step being characterized in that the screen as a whole is applied under pressure to the surface of a layer of said particles spread on a support of sponge rubber.

4. The method as defined in claim 3 wherein said step of depositing phosphor particles onto the screen is further characterized in that said screen is subjected to movement relative to said support in the plane of the screen, while the screen is under pressure against said particles.

References Cited

UNITED STATES PATENTS

| 1,767,374 | 6/1930 | Kirschbraun | 117—26 X |
| 2,854,348 | 9/1958 | Bowerman | 117—33 X |
| 2,992,107 | 7/1961 | Kaplan et al. | 117—9 X |

FOREIGN PATENTS

| 22,448 | 1906 | Great Britain. |
| 1,222,441 | 6/1960 | France. |

ALFRED L. LEAVITT, *Primary Examiner.*

R. L. BROWDY, *Assistant Examiner.*

U.S. Cl. X.R.

117—33, 33.5, 46